United States Patent
Niebling et al.

[11] Patent Number: 5,927,867
[45] Date of Patent: Jul. 27, 1999

[54] ANTIFRICTION BEARING FASTENING ARRANGEMENT

[75] Inventors: Peter Niebling, Bad Kissingen; Reinhold Mahr, Friesenhausen; Rainer Breitenbach, Gochsheim; Vasilis Hassiotis, Niederwerrn, all of Germany

[73] Assignee: FAG Automobiltechnik AG, Germany

[21] Appl. No.: 09/050,277

[22] Filed: Mar. 30, 1998

[30] Foreign Application Priority Data

Mar. 29, 1997 [DE] Germany ................ 197 13 333

[51] Int. Cl.⁶ ............... F16C 43/04; F16C 33/76
[52] U.S. Cl. ............... 384/539; 384/448; 384/484; 384/903; 384/585
[58] Field of Search .................. 384/537, 539, 384/561, 584, 585, 903, 484, 448

[56] References Cited

U.S. PATENT DOCUMENTS

| | | |
|---|---|---|
| 2,792,264 | 5/1957 | House ............................. 384/539 |
| 4,710,037 | 12/1987 | Newberg ........................ 384/537 |
| 5,059,042 | 10/1991 | Grierson ........................ 384/537 |
| 5,370,404 | 12/1994 | Klein et al. ................. 384/484 X |
| 5,564,838 | 10/1996 | Caillault et al. ............ 384/585 X |

*Primary Examiner*—Thomas R. Hannon
*Attorney, Agent, or Firm*—Ostrolenk, Faber, Gerb & Soffen, LLP

[57] ABSTRACT

A fastening arrangement for fastening an antifriction bearing in a housing bore. A securing sleeve is disposed at an edge at the outside and toward one axial end of the outer ring of the bearing. The sleeve has beadlike projections that are sprung radially outwardly and that are received in a groove formed in the housing for axially affixing the bearing in the bore. The securing sleeve is axially sprung against the axial end of the outer ring.

12 Claims, 3 Drawing Sheets

ANTIFRICTION BEARING FASTENING ARRANGEMENT

BACKGROUND OF THE INVENTION

The present invention relates to an antifriction bearing fastening arrangement for fastening the bearing outer ring in a housing bore.

Many antifriction bearing systems must be reliably fastened in a housing bore. In wheel bearings for motor vehicles, in addition to the requirements for a high degree of safety and for providing a fastening means that is easy to install, a specific axial prestress is desired to improve the running behavior of the wheel bearing and avoid so-called cracking noises.

DE 41 17 334 A1 discloses a bearing arrangement for the driven wheels of a motor vehicle having a securing ring that engages in a securing ring groove in the bearing housing. The securing ring has such a width and such a diameter that the securing ring rests on the outer ring of the bearing as a result of axial displacement. The housing which extends axially to the outside from the securing-ring groove is deformed axially inward and has an oblique inner flank. The groove in the housing which receives the securing ring must be produced very accurately and requires space axially outside the bearing seat. In addition, installation of the securing ring is complicated, since it must be inserted using special pliers and must be handled as a separate part.

Furthermore, EP 0 164 447 A1 discloses a bearing arrangement having an antifriction bearing arranged in a bore in a bearing receiving means (bearing bracket). A spring strip is provided with a dividing slot and is secured in the axial direction in the bore. The strip is inserted between the outer ring of the antifriction bearing and the wall of the bore. Outwardly projecting beads provided on the spring strip engage in corresponding depressions in the wall of the bore. However, such a fastening means is suitable only for installations which are subjected to low loading, for example, electric motors. Such means have not been considered for use in wheel bearing systems, especially since the handling and the insertion of the spring strip into the bore are complicated.

SUMMARY OF THE INVENTION

It is an object of the present invention to further develop an antifriction bearing of the type mentioned at the beginning, such that the disadvantages of the prior art are avoided and an easy to install, reliable and secure fastening of the antifriction bearing is achieved with a straightforward and cost effective construction and small dimensions. A fastening device for fastening an antifriction bearing in a housing bore includes a securing sleeve disposed at an edge at the radical outside of and toward one axial end of the outer ring of the bearing. The sleeve has an annular array of beadlike projections that are sprung radially outwardly and that are received in a groove formed in the housing for axially affixing the bearing in the bore. The securing sleeve is also axially sprung against the axial end of the outer ring.

The securing sleeve, which is provided with beadlike projections that spring radially outward, is pressed on the antifriction bearing outer ring. For installation purposes, this produces a structural unit that is easy to handle and that does not require any special pliers or other tools. When the bearing is thereafter being pressed into the housing, the beadlike projections that are sprung outward snap into the internal groove arranged in the housing bore to fix the antifriction bearing in the bore and prevent the bearing from being removed in the direction opposite its insertion. It is advantageous for the securing sleeve to have a region that points radially inward and that rests in an axially sprung manner against the front of the outer ring. This avoids cracking noises.

Other features and advantages of the present invention will become apparent from the following description of the invention which refers to the accompanying drawings.

DETAILED DESCRIPTION OF THE INVENTION

Figure 1:
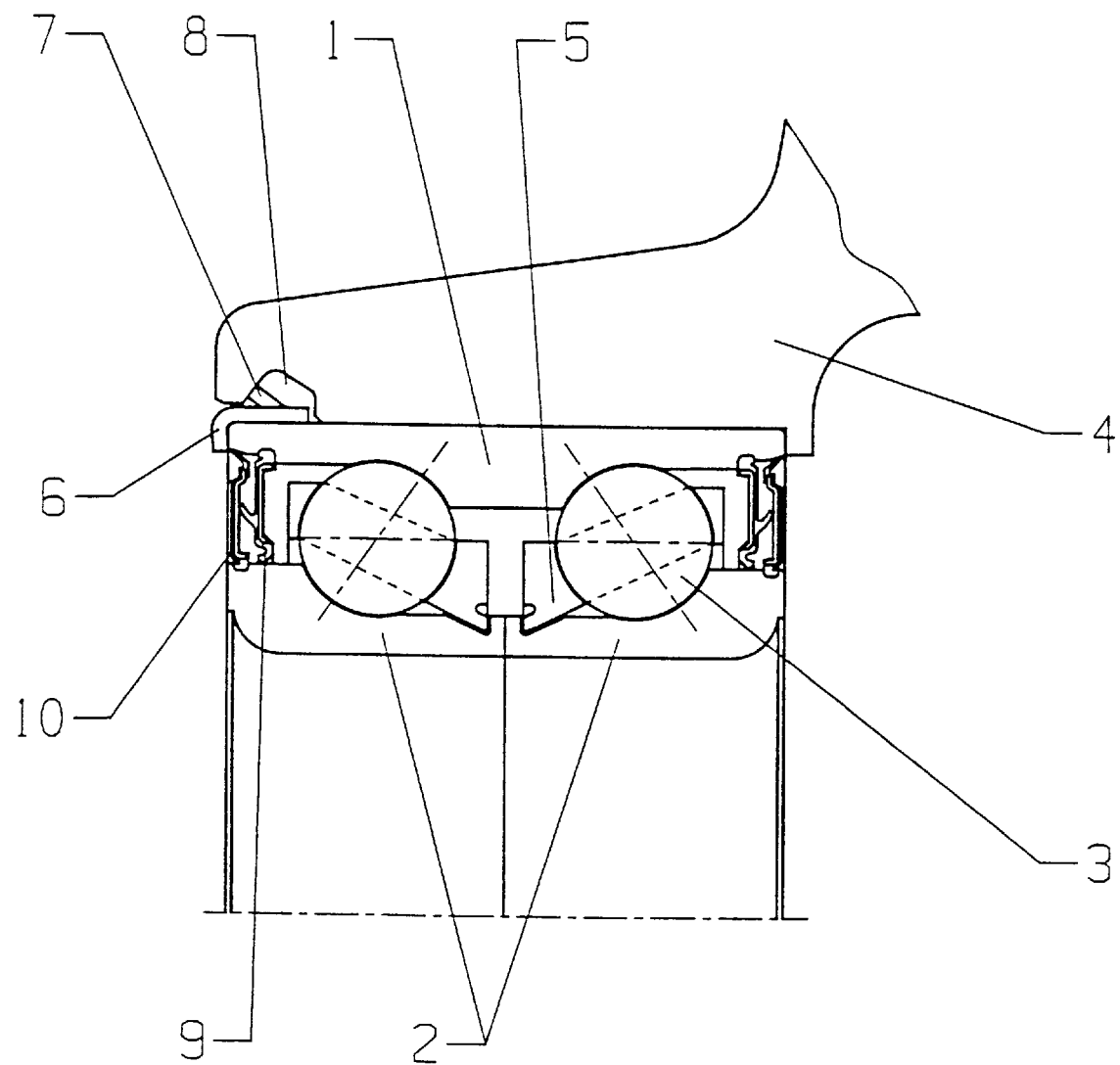
FIG. 1 is a transverse cross-sectional view of a fragment of an inventive antifriction bearing fastening means for a wheel bearing system.

FIG. 1 shows a wheel bearing system including an outer ring 1, an inner ring 2, rolling elements 3 rolling on raceways formed in the opposed ring surfaces and a housing 4 outside the outer ring having a bore in which the outer ring is installed. The rolling elements 3 in each of the two illustrated annular rows thereof are spaced a distance apart from one another by a cage 5.

A securing sleeve 6 is pressed on an edge that is radially outside and axially at the end of the antifriction bearing outer ring 16. The sleeve is provided with at least one, and preferably at least a few, and more preferably an annular array of beadlike projections 7 that are each sprung radially outward.

The housing 4 includes a bore that receives the outer ring 1. An internal groove 8 formed in the bore radially outward of the projections receives the projections 7 which snap into and engage in the groove 8. Since the groove is arranged in the region of the surface of the outer ring, space can be saved in the axial direction.

In addition, conventional bearing sealing disks 9 and centrifugal disks 10 are arranged on both axial sides of the bearing between the inner ring 2 and outer ring 1. In this wheel bearing system, the inner ring 2 is designed in two axially neighboring parts. A single structural unit is achieved by the cages 5 being provided with retaining tabs 11 which engage in annular groove 12 and hold the bearing together, as shown in FIG. 2.

Figure 2:
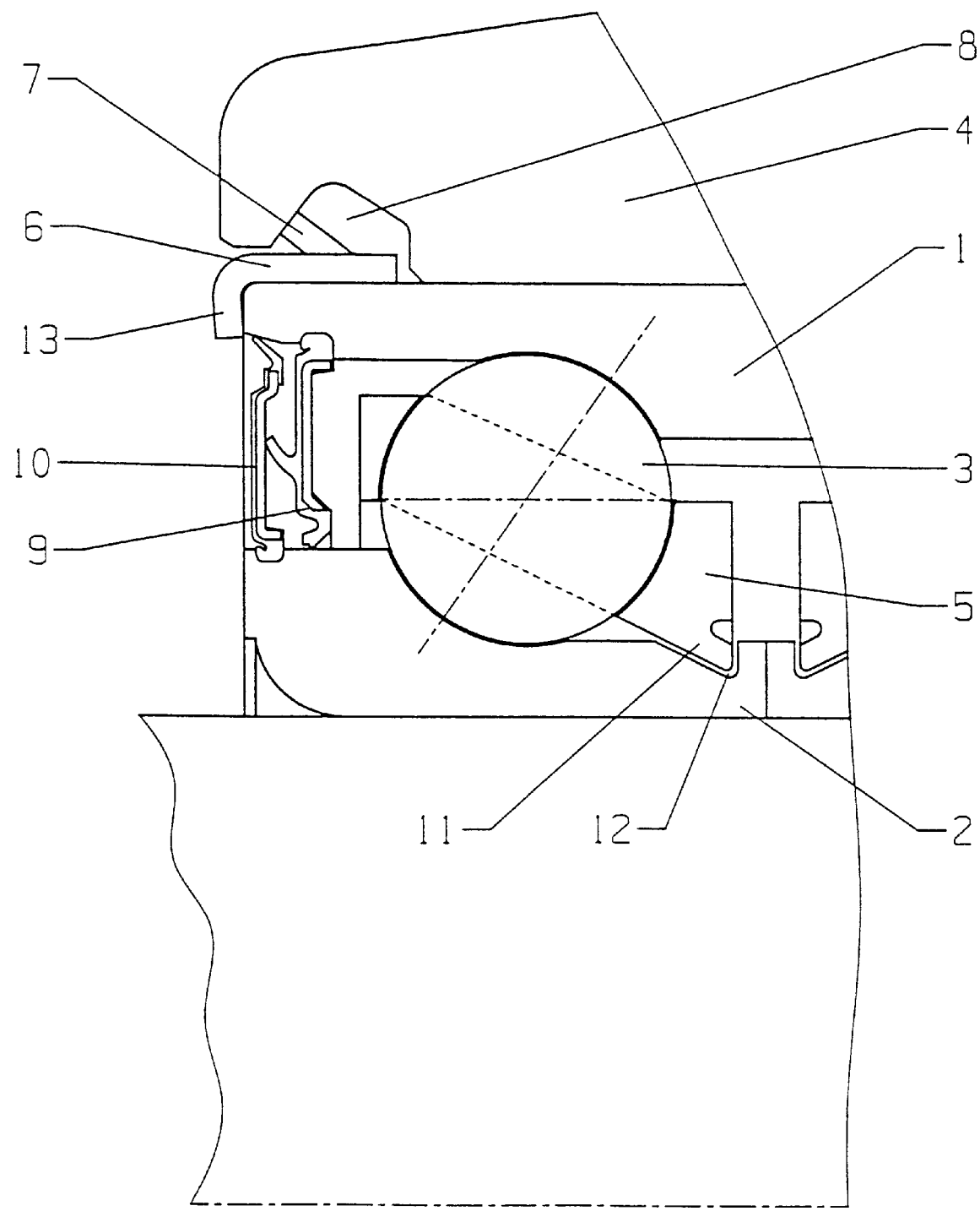
FIG. 2 is a transverse cross-sectional view of a fragment of an inventive antifriction bearing fastening means having a securing sleeve which rests in a sprung manner against the front of the outer ring.

FIG. 2 uses the same reference numbers for the same elements. This securing sleeve 6 has a region 13 that points radially inward and rests in an axially sprung manner against the axial front side of the outer ring 1. This not only enables cracking noise to be reliably avoided, but the spring effect permits the groove 8 to be produced with correspondingly large tolerances. The projections 7 engage behind the groove side wall 7' and secure the antifriction bearing axially in the manner of retaining claws. If the bearing system has to be removed again, the retaining claws 7 are sheared off by applying a defined axial force.

It should be further pointed out that the rotational speed measuring devices that are in common use for antilock braking devices may also be improved by the antifriction bearing fastening means of the invention, since the centrifugal disk 10 is frequently provided with projections or cutouts for pulse generation and the rotational speed sensor (not shown) is arranged opposite the disk, spaced a small axial distance away. This small distance may be kept within narrow tolerances and may reduce the antifriction bearing fastening means of the invention. As a result, the signal quality can be improved.

Figure 3:
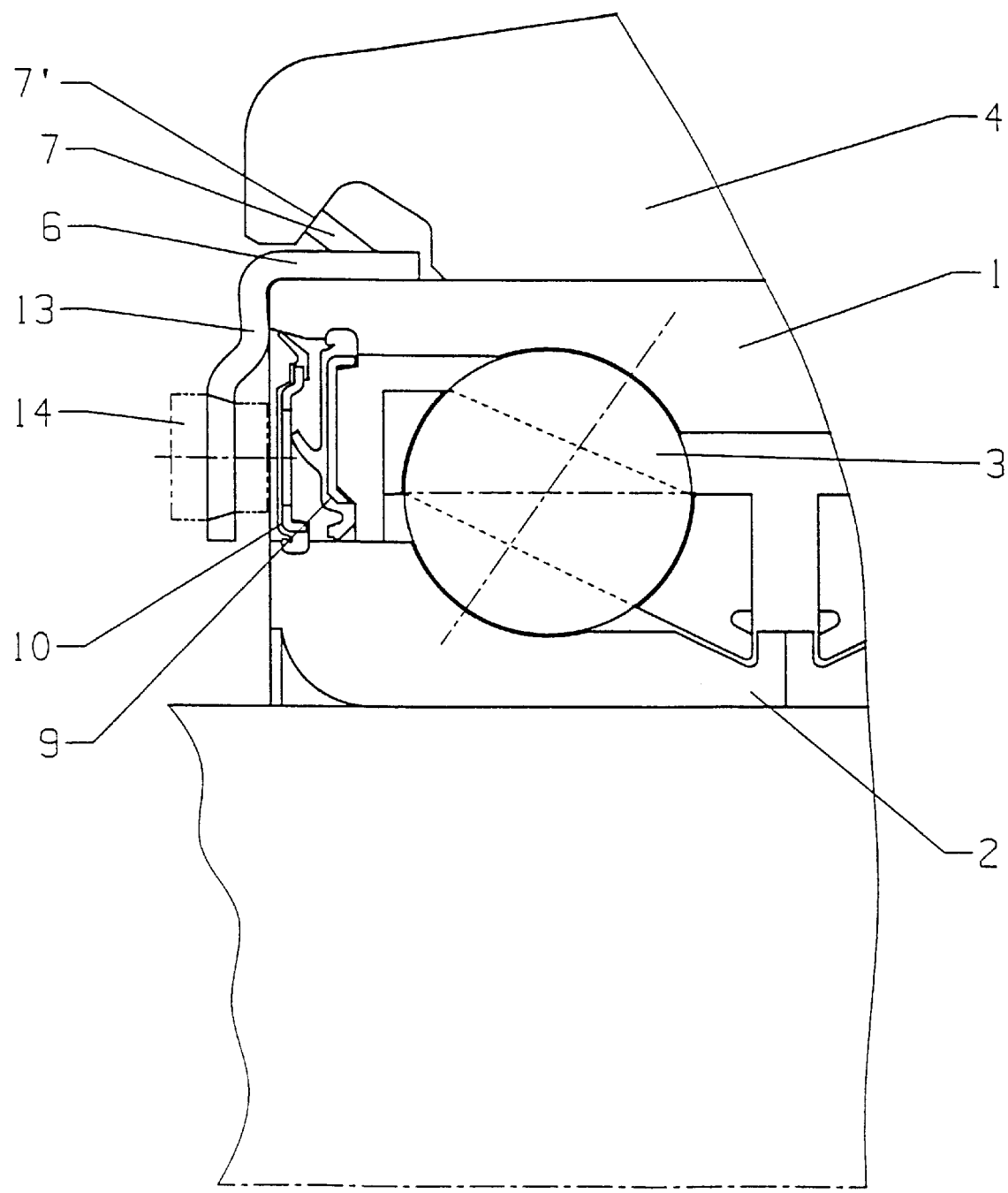
FIG. 3 is a transverse cross-sectional view of a fragment of an inventive antifriction bearing fastening means having a securing sleeve that is provided with a receiving means for a rotational speed sensor.

It is advantageous to equip the securing sleeve 6 with a receiving means 13 for a rotation speed sensor 14, as shown in FIG. 3. This makes it possible to not use further sensor support components. This securing sleeve 6 may be designed cost effectively as a stamped or deep drawn part.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A fastening arrangement for an antifriction bearing, wherein the bearing comprises a bearing outer ring having an exterior, a bearing inner ring in the outer ring, a row of bearing rolling elements between the inner and the outer rings;

a securing ring secured on the exterior of the outer ring; projections on the outer ring are normally sprung radially outwardly from the outer ring such that when the bearing is pressed into an opening in a housing, the projections can snap into a receiver in the housing so that the cooperation between the projections and the receiver fix the bearing axially in the housing.

2. The fastening arrangement of claim 1, wherein the projections are beadlike.

3. The fastening arrangement of claim 1, wherein the projections are arrayed around the outer ring.

4. The fastening arrangement of claim 1, wherein the outer ring has an axial end; the securing sleeve includes a portion thereof extending radially inward over the axial end of the outer ring.

5. The fastening arrangement of claim 4, wherein the securing sleeve is shaped and of such material that the portion of the securing sleeve is axially sprung against the axial end of the outer ring.

6. The fastening arrangement of claim 4, wherein the projections are inclined in the direction toward the axial end of the outer ring such that the projections permit insertion of the outer ring into a housing while blocking removal of the outer ring from the housing in the opposite direction.

7. The fastening arrangement of claim 4, wherein the securing sleeve is a stamped or deep drawn part.

8. The fastening arrangement of claim 7, wherein the securing sleeve includes receiving means for a rotational speed sensor.

9. The fastening arrangement of claim 8, further comprising a rotational speed sensor supported on the receiving means.

10. The fastening arrangement of claim 1, wherein the securing sleeve includes a receiving means thereon for a rotational speed sensor and for supporting the rotational speed sensor generally at and for sensing the relative rotation of the outer and inner rings.

11. In combination, the fastening arrangement of claim 1 and a housing, the housing including a bore therein in which the outer ring and the bearing are installed, a receiver in the bore for the projections on the sleeve for enabling the sleeve with the projections to be installed in the bore and the receiver being shaped for blocking removal of the sleeve from the bore in the opposite direction.

12. The combination of claim 11, wherein the receiver in the bore comprises a groove shaped for having the projections sprung radially into the groove and the projections and the groove being so shaped as to prevent extraction of the projections and the outer ring from the bore.

* * * * *